United States Patent
Vidyanand (10) Patent No.: US 7,031,015 B2
(45) Date of Patent: *Apr. 18, 2006

(54) VARIABLE DATA PRINT JOB SYSTEM

(75) Inventor: Ramgopal Vidyanand, Cupertino, CA (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/971,512

(22) Filed: Oct. 22, 2004

(65) Prior Publication Data

US 2005/0094204 A1    May 5, 2005

Related U.S. Application Data (63) Continuation of application No. 10/375,572, filed on Feb. 27, 2003, now Pat. No. 6,836,342, which is a continuation of application No. 09/977,097, filed on Oct. 11, 2001, now Pat. No. 6,549,294, which is a continuation of application No. 09/312,908, filed on May 17, 1999, now Pat. No. 6,330,071.

(51) Int. Cl.
    *G06F 15/00* (2006.01)
(52) U.S. Cl. .................. 358/1.18; 358/1.12; 358/1.14; 358/1.16
(58) Field of Classification Search ............... 358/1.18, 358/1.12–1.17, 448, 450, 452; 382/235, 382/303

See application file for complete search history.

(56) References Cited

U.S. PATENT DOCUMENTS

| | | | |
|---|---|---|---|
| 5,043,749 A | 8/1991 | Punater et al. | |
| 5,113,494 A | 5/1992 | Menendez et al. | |
| 5,136,316 A | 8/1992 | Punater et al. | |
| 5,495,561 A | 2/1996 | Holt | |
| 5,740,338 A | 4/1998 | Gauthier et al. | |
| 5,796,930 A | 8/1998 | Gauthier et al. | |
| 5,963,968 A | 10/1999 | Warmus et al. | |
| 6,134,018 A | 10/2000 | Dziesietnik et al. | |
| 6,330,071 B1 | 12/2001 | Vidyanand | |
| 6,836,342 B1 * | 12/2004 | Vidyanand | .................. 358/1.18 |

FOREIGN PATENT DOCUMENTS

| | | |
|---|---|---|
| EP | 0653700 A1 | 5/1995 |
| EP | 0806721 A1 | 12/1997 |
| EP | 0858041 A2 | 12/1998 |
| EP | 0924574 A2 | 6/1999 |
| WO | WO 99/17539 | 4/1999 |

* cited by examiner

*Primary Examiner*—Twyler M. Lamb (57) ABSTRACT

This invention relates to variable data print job systems. In particular, this invention relates to variable data print job systems that reduce the master and variable jobs to a single job that does not require indefinite disk storage on a printer. A first part of the job contains the master data pages and a second part of the job contains the variable data. The print job is assembled and sent to the printer, which detects that the job is a two part job. The printer places the master data in the page buffer and copies it to another area of the page buffer so that a page of the variable data can be overlaid on the page buffer, which is then sent to the print engine for printing.

12 Claims, 8 Drawing Sheets

Fig. 1

Prior Art

Fig. 2

Prior Art

Fig. 3

Prior Art

Prior Art

Prior Art

VARIABLE DATA PRINT JOB SYSTEM

REFERENCE TO RELATED APPLICATIONS

This application is a continuation of U.S. application Ser. No. 10/375,572, filed 27 Feb. 2003, now U.S. Pat. No. 6,836,342, which is a continuation of U.S. application Ser. No. 09/977,097, filed 11 Oct. 2001, now U.S. Pat. No. 6,549,294, which is a continuation of U.S. application Ser. No. 09/312,908, filed 17 May 1999, now U.S. Pat. No. 6,330,071.

FIELD OF THE INVENTION

The invention relates to the printing of electronic documents in a computer environment. More particularly, the invention relates to the organization, storage, and printing of variable and master data in a computer environment.

BACKGROUND OF THE INVENTION

Figure 1:
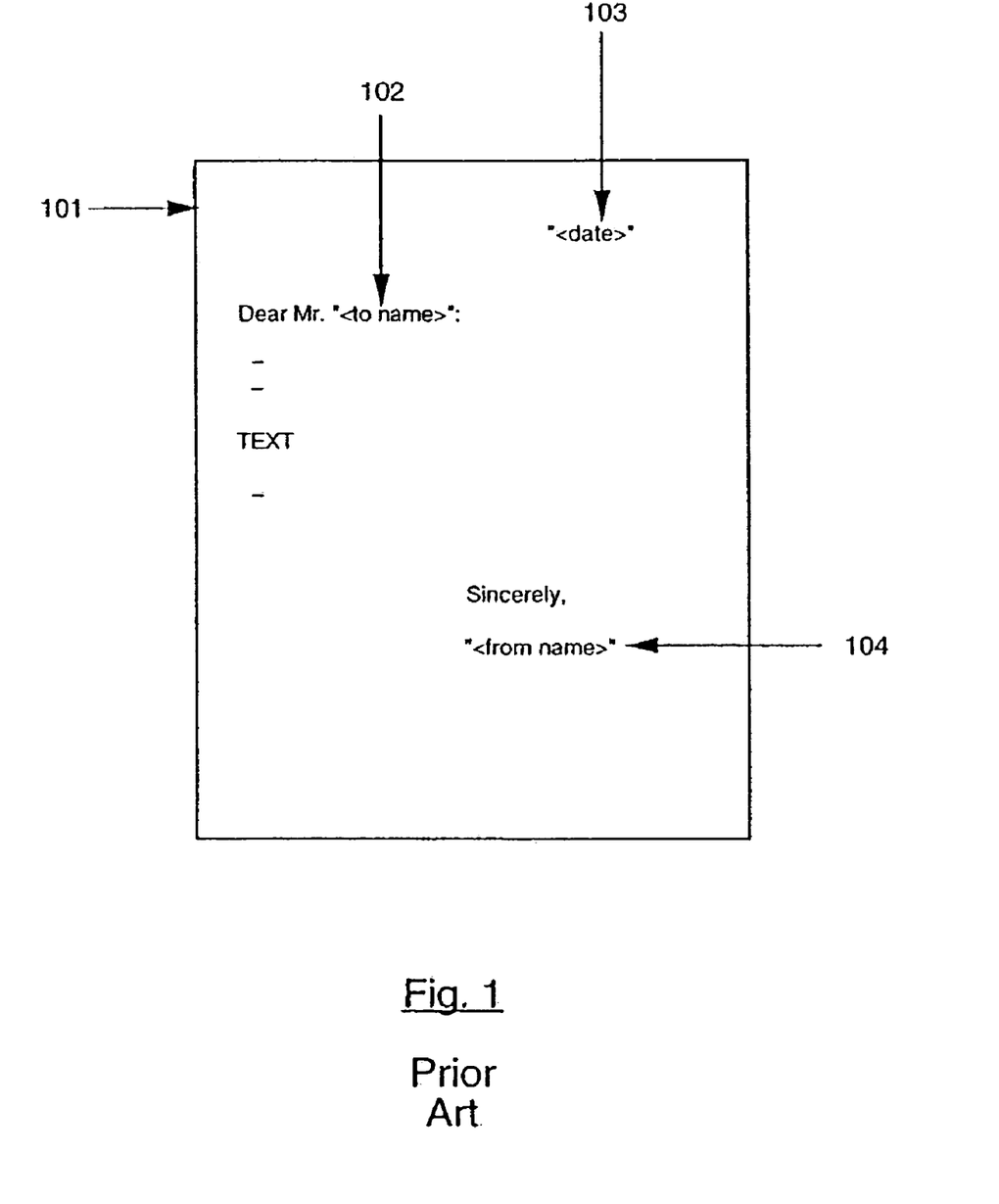
FIG. 1 is an example of a master data page according to the invention.

Variable data printing involves how master and variable data are sent to a printer or intermediate storage device, how the master data are stored on the printer or intermediate storage device, and how the master and the variable data are combined. Referring to FIG. 1, a page of master data 101 contains tags or placeholders that are to be filled in with variable data. For example, the date tag 103 will be overlaid with the appropriate date information from a variable data page.

Figure 2:
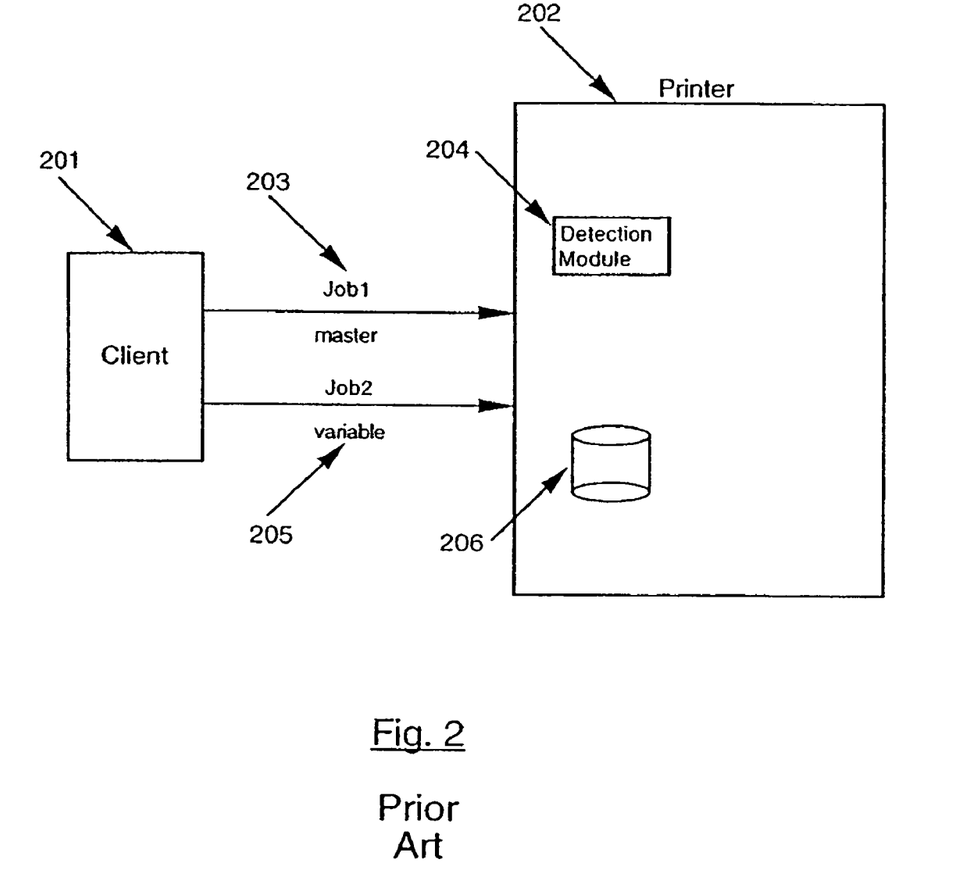
FIG. 2 is a block schematic diagram of a prior art approach sending a separate master and variable data job to a printer according to the invention.

There are two approaches that are most commonly used for the printing of variable data. With respect to FIG. 2, the first approach is shown. The client 201 sends two jobs to the printer 202. The first job contains the master data 203 and the second job contains the variable data 205. A detection mechanism 204 resides on the printer, and checks each incoming job to see if it is a master. If it is a master, then it is stored and indexed on the disk 206. The variable job 205 is checked to see if has a reference to a master. If it does, then the master is retrieved from the disk 206. Both the variable and master data are then combined and printed. If the variable job 205 does not reference a master then only the variable data is printed.

Gauthier et al. U.S. Pat. No. 5,740,338, describes a method for merging variable image data into a template image. The variable image data bitmap is merged with the template image bitmap by producing merged image data bands, which are then dispatched to the print engine.

Figure 3:
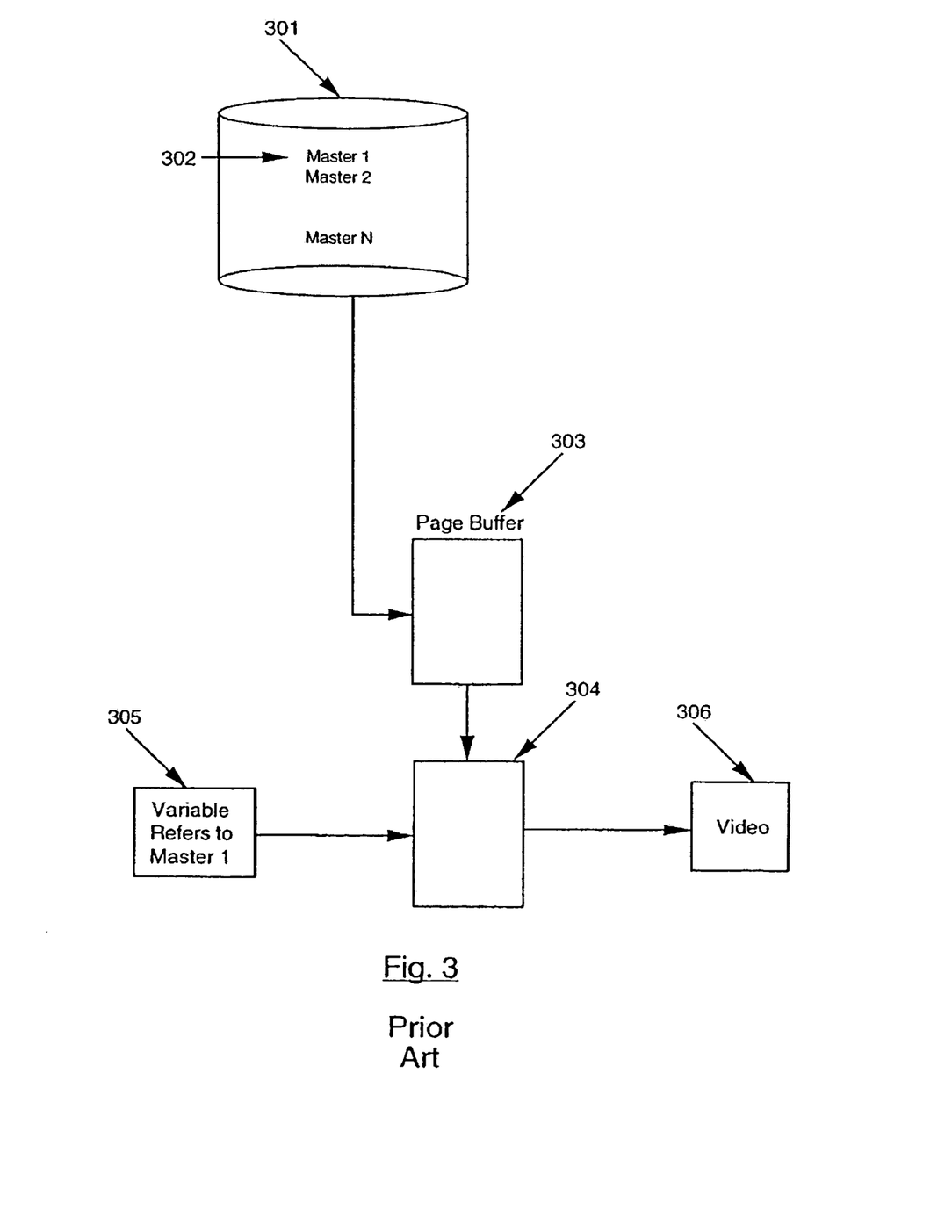
FIG. 3 is a block schematic diagram of the master data storage and printing mechanism of a prior art approach according to the invention.

Referring to FIG. 3, the disk on the printer 301 contains the master data images 302. Each master is indexed. When a variable job comes into the printer and refers to a master 305, the master is retrieved from the disk 301 and placed into the page buffer memory 303. The variable data are superimposed on the master data 304 and then sent to the printer engine 306. The master page remains in memory 304 while each variable page of the job is overlaid onto the master page 304 and printed 306.

Figure 4:
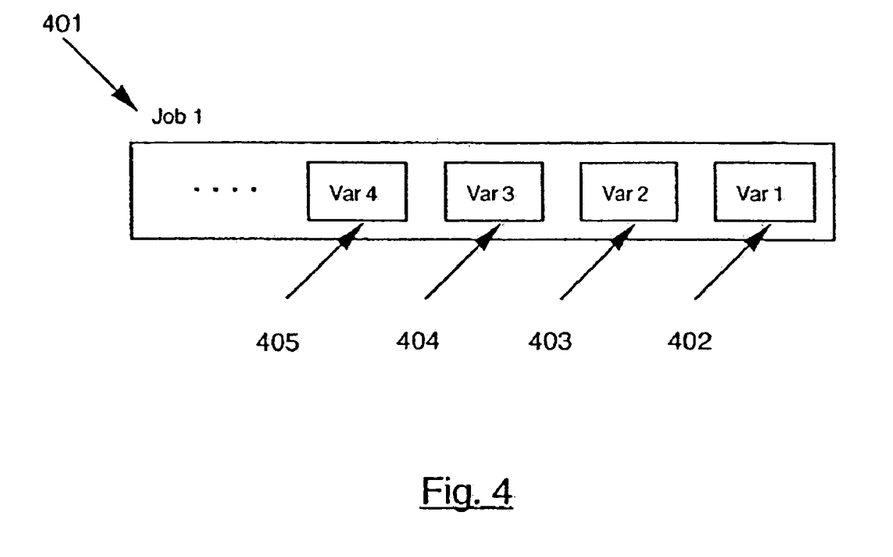
FIG. 4 is a block schematic diagram of a variable data print job according to the invention.

Variable data in the job are overlaid onto the master sequentially when there are multiple pages in the master data. For example, with respect to FIG. 4, if a master consists of two pages, and the variable print job 401 contains four pages, then variable pages one 402, and two 403 are first overlaid onto master pages one and two, respectively, and printed. Variable pages three 404 and four 405 are then overlaid onto master pages one and two, respectively, and printed. The sequential pages are assumed to belong to the respective master pages.

This approach requires a storage medium to store the masters. A separate job must be sent from the client to the printer to install the master on the disk. In print systems that do not include bi-directional communication between the client and the printer, masters may reside on the disk in the printer indefinitely because their placement and indices are not known to the client, and the client may be unable to delete the master that it previously installed. The amount of space allocated to master storage can fill up to the point where jobs are rejected because of the lack of disk space. For print systems that include bi-directional communication between the client and the printer, features have to be added with security levels to aid periodically cleaning up of the disk. Another drawback to this approach is that it is difficult to use multiple master pages. Variable pages are assumed to belong to a particular set of master pages. This does not allow for a change of master data during a job. The variable job must be split into several smaller jobs to use multiple masters. Additionally, separate jobs must be sent to the printer for each master.

Figure 5:
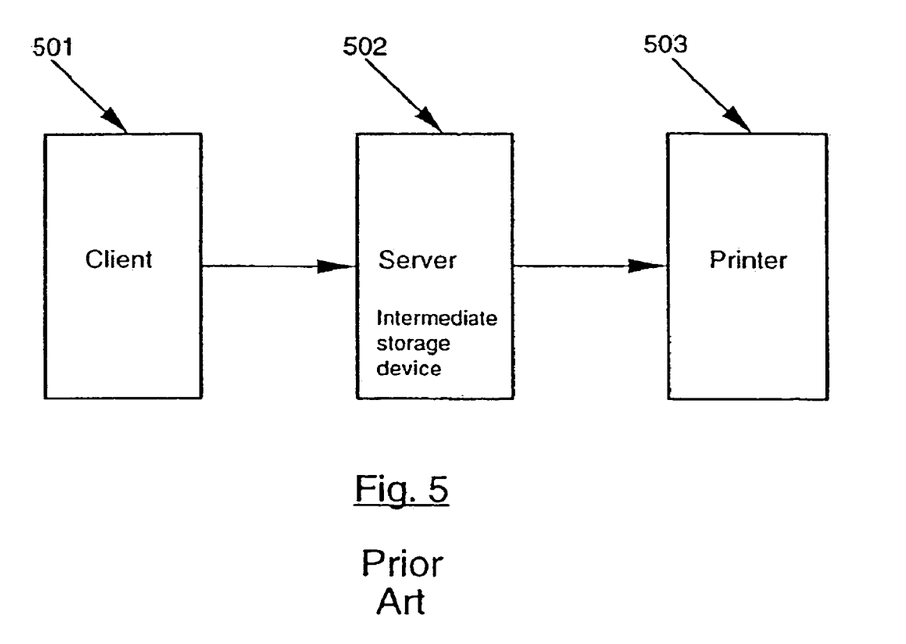
FIG. 5 is a block schematic diagram of a prior art approach using an intermediate storage device to assemble print jobs according to the invention.

Referring to FIG. 5, in the second approach, the client 501 sends the print jobs to an intermediate server 502. The intermediate server 502 controls the data flow to the printer 503. The intermediate server 502 stores the master data, combines the master and variable data, then sends the combined data to the printer. This type of approach is described in Warmus et al. European Patent Application No. 0858041A2, which describes a method for reproducing master and variable information on a display device. A database is developed having a number of entries representing variable printed information with the display device responsive to sets of template data and the database.

It would be advantageous to provide a variable data print job system that eliminates the need for a separate job containing the master data to be sent to the printer and also simplifies the use of multiple masters. It would further be advantageous to provide a variable data print job system that does not require the indefinite storage of master data on the printer disk.

SUMMARY OF THE INVENTION

The invention provides a variable data print job system. The system simplifies the use of multiple-master jobs and eliminates the need for splitting the print job into a master data job and a variable data job, thereby conserving system time and costs. In addition, the invention provides a system that does not indefinitely consume disk storage space on a printer or print server.

A preferred embodiment of the invention reduces the master and variable jobs into a single job that does not require indefinite disk storage on the printer. A single job is sent from the client to the printer. The print job has two parts. The first part of the job contains the master data pages and the second part of the job contains the variable data. The print job is then sent to the printer.

The printer receives the job and detects that the job is a two part job. It places the master data in the page buffer. The master page in the page buffer is copied to another area of the page buffer so a page of the variable data can be overlaid onto the page buffer. The combined page is then sent to the print engine for printing. This process is repeated for each page of variable data.

The invention expands upon this concept and handles multiple masters. The print job contains variable data grouped with the associated master data. The single print job is assembled with the sequential variable data pages placed immediately after their associated master pages in a serial fashion. The printer simply decodes the job serially and places the master data into the page buffer whenever master data are encountered in the job stream. The variable data are overlaid onto their respective master data in the page buffer memory and printed.

Another preferred embodiment of the invention adds master indexing to each page of a variable job. The print job contains both the master and variable data. The master data is grouped in the front of the job. Each variable page in the print job contains an index indicating the master data that it is associated with. The printer loads each master data into the page buffer that is called up through the variable page index. The variable page is then overlaid onto the master page and sent to the print engine for printing.

A further preferred embodiment of the invention modifies the traditional two-job approach. The first job that is sent from the client to the printer contains the master data. Each page of a multiple-page master is sub-indexed on the printer disk instead of the traditional approach where a multiple-page master is stored as one index. The second job contains the variable data associated with the master data. The variable data contain the index to the associated master page. The printer finds the appropriate master page and loads it into the page buffer. The variable page is then overlaid onto the master page. The combined page is then sent to the printer engine.

Other aspects and advantages of the invention will become apparent from the following detailed description in combination with the accompanying drawings, illustrating, by way of example, the principles of the invention.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION OF THE INVENTION

The invention is embodied in a variable data print job system in a computer environment. A system according to the invention creates a variable data print job that does not indefinitely consume disk storage space on a printer or print server. In addition, the invention provides a system that simplifies the use of multiple-master jobs and eliminates the need for splitting the print job into a master data job and a variable data job, thereby conserving system time and costs.

A preferred embodiment of the invention reduces the master and variable jobs into a single job that does not require indefinite disk storage on the printer. With respect to FIGS. 6 and 7, a single job 602 is sent from the client 601 to the printer 603. The print job 701 has two parts. The first part of the job 701 contains the master data pages 702, 703, 704. The second part of the job 701 contains the variable data 705, 706, 707, 708, 709. The client 601 creates the job by separating the master data from the variable data. Each page 702, 703, 704 of the master data is gathered, assembled and placed at the beginning of the print job 701. The variable data 705, 706, 707, 708, 709 are assembled and placed after the master data. The client 601 then sends the assembled job 701 to the printer 603.

Figure 8:
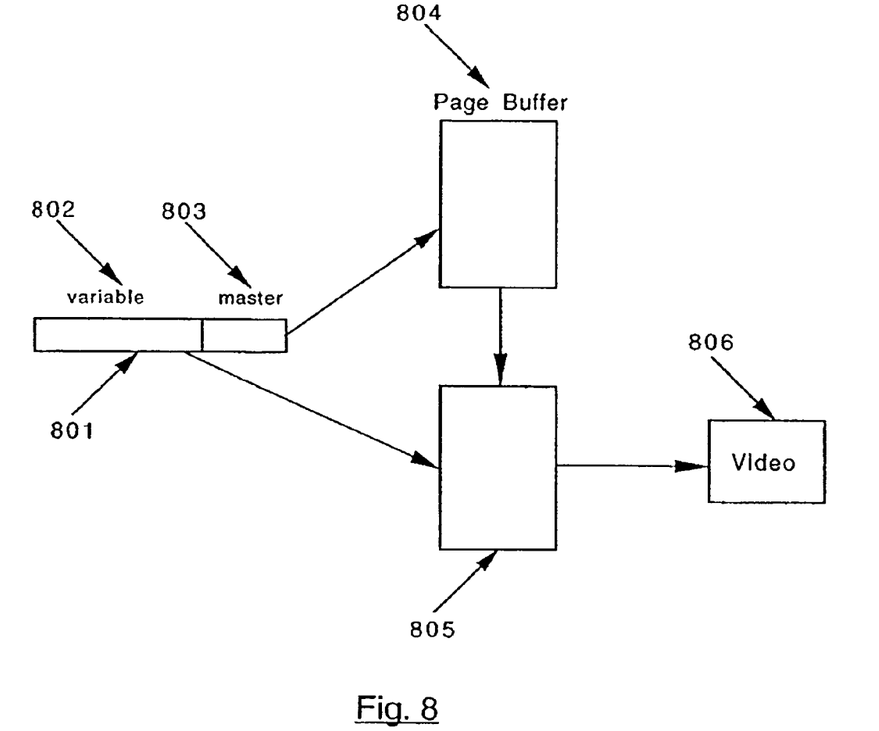
FIG. 8 is a block schematic diagram of the processing of a master/variable print job according to the invention.

Referring to FIG. 8, the printer receives the job 801 and detects that the job is a two part job. It raster image processes ("RIPs") and stores the master data 803 in a page buffer 804. This could be stored in a compressed or non-compressed format. The master page in the page buffer 804 is copied to another area of the page buffer 805. A page of the variable data 802 is then overlaid onto the page buffer 805. The combined page 805 is then sent to the print engine 806 for printing. This process is repeated for each page of variable data.

This approach works well for disk and diskless printers. A diskless system depends on the size of the RAM available in the printer and the size of the master, e.g. if there are two pages of master data, the system first stores the two master data pages in the page buffer. It then takes the first two pages of variable data and superimposes them onto the master pages. Variable page one is superimposed on master page one and variable page two is superimposed on master page two. The resulting pages are then sent out to video. Next, page three and four are superimposed on master pages one and two, respectively. The pattern continues for the rest of the variable part of the job. This approach eliminates the need for a disk on the printer.

Another preferred embodiment of the invention expands upon this concept and handles multiple masters. Users often create single jobs that use several different master data. For example, a slide presentation may change backgrounds several times during the slide progression. With respect to FIGS. 6 and 9, the print job 901 contains variable data 902, 904 associated with each master 903, 905. There is no longer a need to send multiple jobs from the client to use multiple masters. Even in the case involving a system with a disk, the advantage of this approach is that the job can be spooled onto disk and kept there temporarily while printing, thereby efficiently utilizing the memory on the printer.

Figure 6:
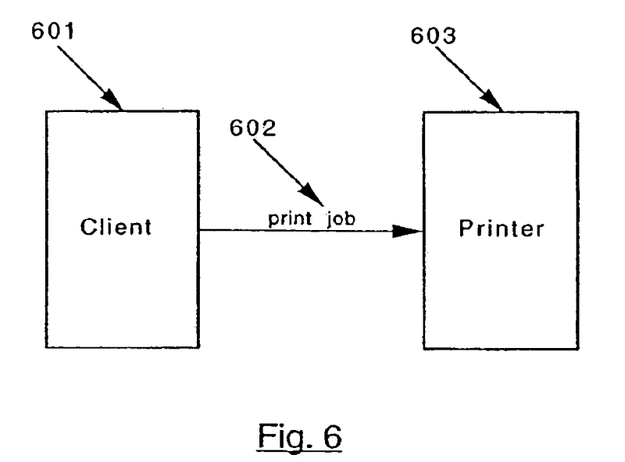
FIG. 6 is a block schematic diagram of a preferred embodiment of the invention sending a single master and variable data print job from a client to a printer according to the invention.
Figure 7:
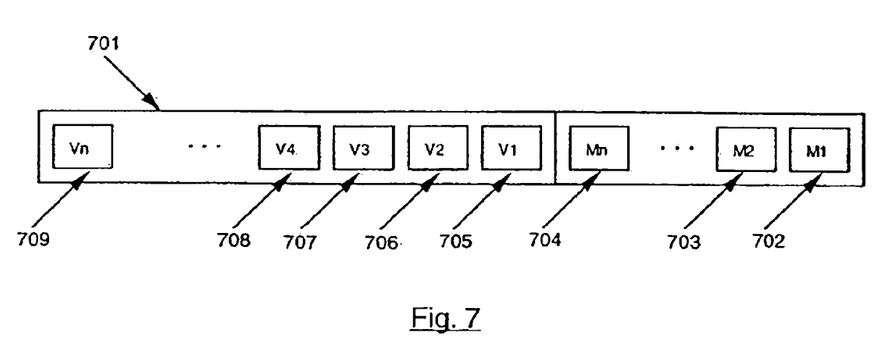
FIG. 7 is a block schematic diagram of a preferred embodiment of the invention combining master data with variable data in a single print job according to the invention.
Figure 9:
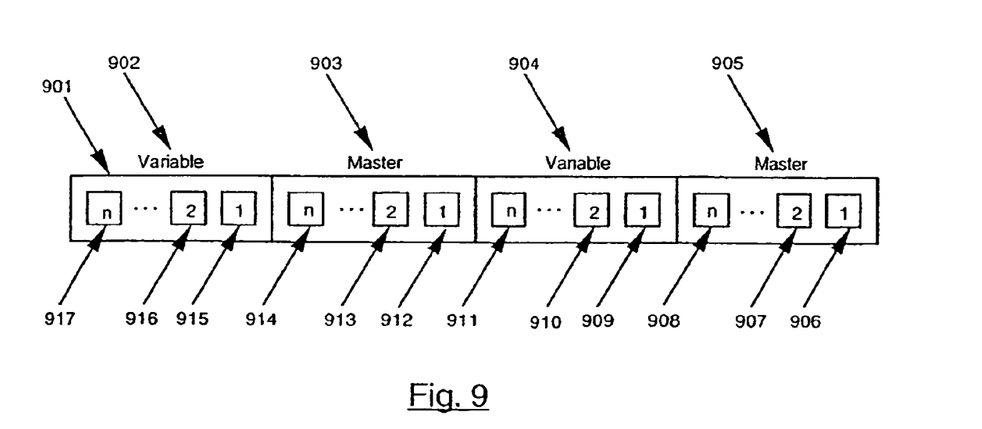
FIG. 9 is a block schematic diagram of a multiple-master/variable data print job according to the invention.

The client 601 creates the multiple master print job 901 by grouping the variable data with the associated master data. The single print job 901 is assembled with the sequential variable data pages placed immediately after their associated master pages in a serial fashion. For example, the variable data 904 is associated with the master data 905 and the variable data 902 is associated with the master data 903. The printer 603 simply decodes the job 901 serially and places the master data into memory whenever master data are encountered in the job stream 901. The variable data are overlaid onto their respective master data in the page buffer memory.

Application programs can now organize print jobs more efficiently. For example, given a 20-page slide job that is 200 kB per page and occupies 4 MB of total memory. If the job has a common graphic background among all 20 pages that takes up 175 kB, then methods in accordance with this invention will turn the job into a 21-page job. The first page will be the master page containing 175 kB of data, followed by 20 pages of variable pages each taking 25 kB of memory. This leads to a job size of 675 kB versus 4 MB from the normal approach—a savings of over 3 MB and a speed increase of almost 4 times.

The invention saves businesses such as service bureaus time and makes the use of their equipment more efficient. These businesses do not want to install a set of master data onto their printers for every customer that they do work for. It becomes much simpler for them to send one job to their printers containing all of the information necessary—without indefinitely consuming memory space on the printers. Problems such as running out of disk space or the inability to accept anymore masters occur when the memory is filled with masters.

Figure 10:
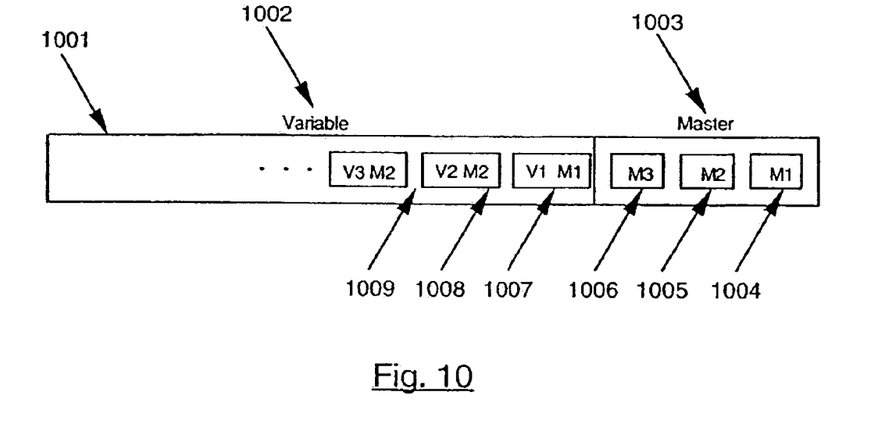
FIG. 10 is a block schematic diagram of an indexed variable page print job according to the invention.

Referring to FIG. 10, another preferred embodiment of the invention adds master indexing to each page of a variable job. The print job 1001 comprises the master data 1003 in front of the variable data 1002. Each variable page contains an index indicating the master data that it is associated with. Here, variable page V1 1007 has an index of M1, indicating that it is to be overlaid onto master data M1 1004. Variable pages V2 1008 and V3 1009 have indexes of M2 1005, indicating in the same manner that they are to be overlaid onto master data M2 1005.

The printer loads each master data into the page buffer that is called up through the variable page index. The variable page is then overlaid onto the master page and sent to the print engine for printing. This generally proceeds in a serial fashion as each master data in the page buffer is discarded when a new master data is indexed. However, the master data can be randomly indexed and loaded into the page buffer if the printer disk is used to temporarily store the master data. Once the job is finished, the disk is cleared of the master pages for that job.

The number of master pages sent in the job can be adjusted to accommodate the configuration of the specific printer by using the information from the printer driver, configuration file, or printer status feedback. For example, if the printer is a diskless system and has two pages of page buffer, then only two master pages will be sent along with the associated variable data for the job.

Figure 11:
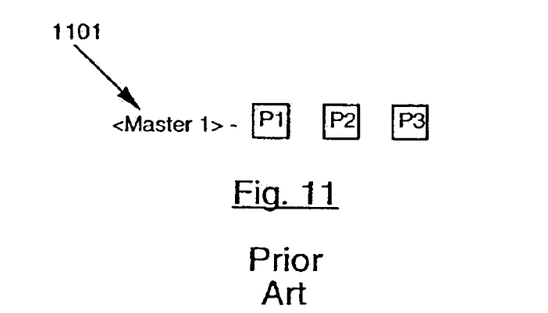
FIG. 11 is a block schematic diagram of a traditional master data index according to the invention.
Figure 12:
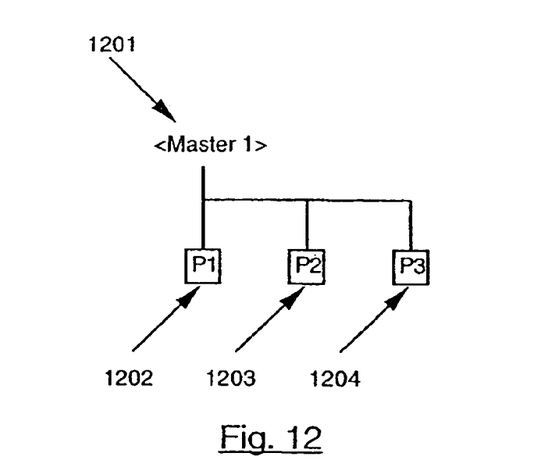
FIG. 12 is a block schematic diagram of a sub-indexed master page scheme according to the invention.
Figure 13:
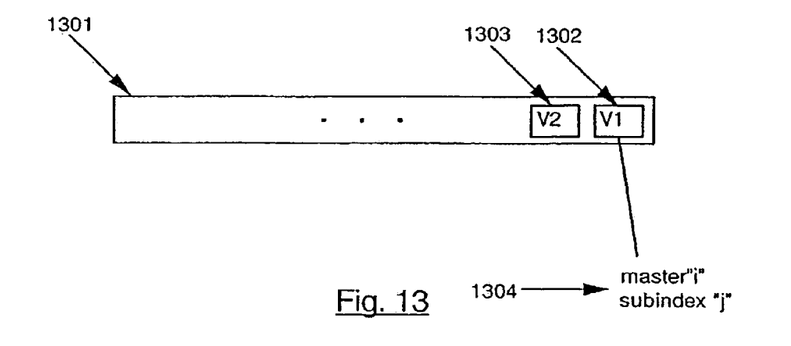
FIG. 13 is a block schematic diagram of a variable data print job with sub-indexing of master pages according to the invention.

With respect to FIGS. 11 and 12, another preferred embodiment of the invention modifies the traditional two-job approach. The first job that is sent from the client to the printer contains the master data. Each page of a multiple-page master 1201 is sub-indexed 1202, 1203, 1204 on the printer disk instead of the traditional approach where a multiple-page master is stored as one index 1101. Referring to FIGS. 12 and 13, the second job 1301 contains the variable data 1302, 1303 associated with the master data 1201. The variable data contain the index to the associated master page. The variable page 1303 references the master data index "i" and the sub-index "j" 1304. The printer finds the appropriate master page and loads it into the page buffer. The variable page is then overlaid onto the master page. The combined page is then sent to the printer engine.

Figure 14:
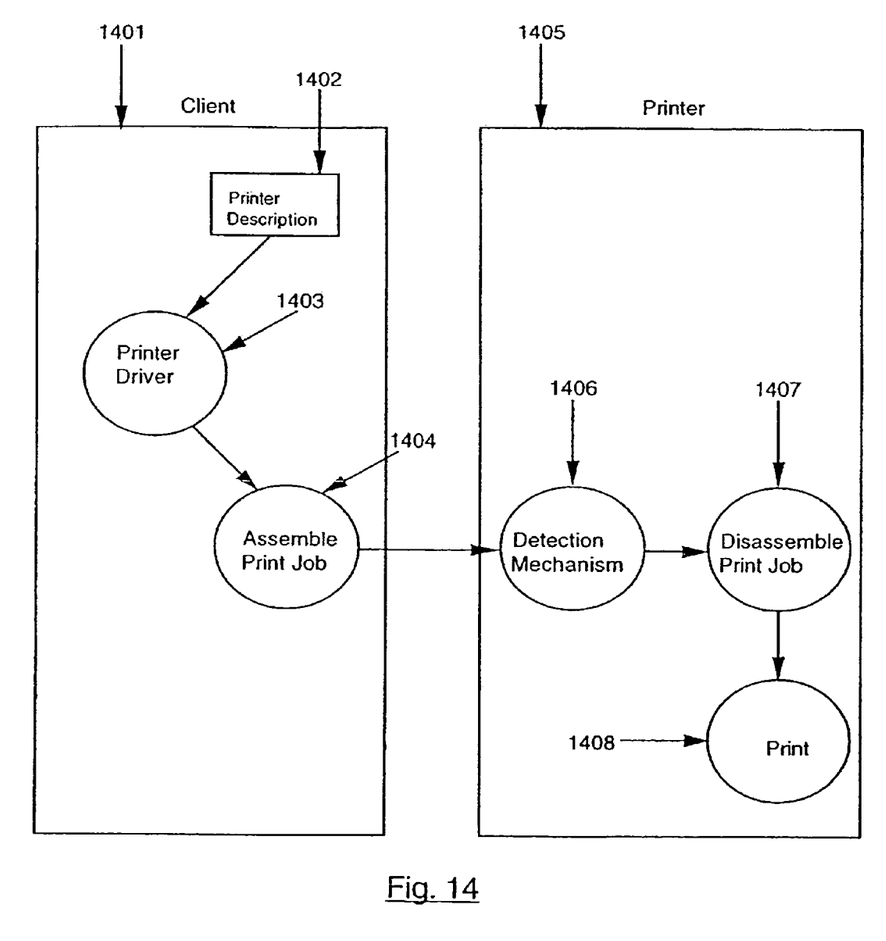
FIG. 14 is a block schematic diagram of a task-oriented view of a preferred embodiment of the invention according to the invention.

With respect to FIG. 14, a task-oriented view of the invention is shown. The Printer Driver 1403 resides on the Client 1401. A print job is sent through the Printer Driver 1403 which indicates the destination printer. The Print Driver 1403 can determine the configuration of a specific destination printer from the Printer Description information 1402. The Printer Description information 1402 contains static and/or dynamic printer configuration information.

The Printer Driver 1403 tags the master and variable data for the print job and sends the data, along with the destination printer description to the Assemble Print Job task 1404. The Assemble Print Job task 1404 uses the specific printer description information, if necessary, to assemble the print job. The Assemble Print Job task 1404 assembles the print job according to any of the previously described embodiments of the invention. For example, the Assemble Print Job task 1404 can place the master data in front of the variable data in a single print job or create multiple jobs depending upon the printer configuration (e.g., a diskless system with two pages of page buffer memory is sent a maximum of two master pages per print job). The print job is then sent to the printer or print server 1405. The assemble print job task can also be done by the user.

The Detection Mechanism 1406 on the printer 1405 receives the print job from the client 1401. The Detection Mechanism 1406 detects that the print job is special and the job is forwarded to the Disassemble Print Job task 1407. The Disassemble Print Job task 1407 disassembles the print job and overlays the proper variable pages onto the appropriate master pages as described above for each preferred embodiment of the invention. Each combined page is sent to the print engine 1408 to be printed.

The foregoing merely illustrates the principles of this invention, and various modifications can be made by persons of ordinary skill in the art without departing from the scope and spirit of this invention.

I claim:

1. Apparatus for processing master data and variable data to provide a single variable data print job, the apparatus comprising:
    a means for separating the master data from the variable data; and
    a means for assembling the master data and the variable data into the single variable data print job by placing the master data at a beginning of the single variable data print job, and placing the variable data at an end of the single variable data print job.

2. The apparatus of claim 1, further comprising means for sending the single variable data print job to a printer.

3. The apparatus of claim 2, wherein the printer raster image processes and stores the master data in a page buffer.

4. The apparatus of claim 3, wherein the raster image processed master data are stored in a compressed form.

5. The apparatus of claim 3, wherein the raster image processed master data are stored in an uncompressed form.

6. The apparatus of claim 3, wherein the printer further overlays the variable data onto the page buffer.

7. The apparatus of claim 2, wherein the printer comprises a hard disk.

8. The apparatus of claim 2, wherein the printer comprises a diskless printer.

9. The apparatus of claim 1, wherein the master data comprises a single master job.

10. The apparatus of claim 1, wherein the master data comprises a plurality of master jobs.

11. The apparatus of claim 10, wherein the variable data comprises a plurality of variable data jobs, wherein each variable data job is associated with a corresponding master job.

12. The apparatus of claim 11, wherein each variable data job is placed in the single variable data print job after the associated master job.

* * * * *